United States Patent
Leimann

(10) Patent No.: US 7,552,536 B2
(45) Date of Patent: Jun. 30, 2009

(54) METHOD OF ASSEMBLING A TAPER ROLLER BEARING

(75) Inventor: Dirk-Olaf Leimann, Antwerp (BE)

(73) Assignee: Hansen Transmissions International, N.V., Edegem, Antwerp (BE)

( * ) Notice: Subject to any disclaimer, the term of this patent is extended or adjusted under 35 U.S.C. 154(b) by 351 days.

(21) Appl. No.: 11/337,607

(22) Filed: Jan. 24, 2006

(65) Prior Publication Data
US 2006/0117567 A1 Jun. 8, 2006

Related U.S. Application Data

(62) Division of application No. 10/471,237, filed as application No. PCT/IB02/01647 on Mar. 8, 2002, now Pat. No. 7,210,852.

(30) Foreign Application Priority Data
Mar. 9, 2001 (GB) ................................. 0105799.1

(51) Int. Cl.
*B21D 53/10* (2006.01)
(52) U.S. Cl. ............................ 29/898.061; 29/898.062; 29/898.064; 29/898.09; 384/571

(58) Field of Classification Search ............. 29/898, 29/898.03, 898.04, 898.041, 898.042, 898.043, 29/898.047, 898.06, 898.061, 898.062, 898.064, 29/724; 384/571, 450
See application file for complete search history.

(56) References Cited

U.S. PATENT DOCUMENTS

| 606,635 A | 6/1898 | Timken |
| 1,545,841 A | 7/1925 | Miller |
| 1,784,914 A | 12/1930 | Strickland et al. |
| 2,474,016 A | 6/1949 | Sydney |
| 4,783,182 A * | 11/1988 | Caron et al. ............... 384/504 |
| 5,037,214 A * | 8/1991 | Dougherty ................. 384/571 |

FOREIGN PATENT DOCUMENTS

| FR | 750 195 | 8/1933 |
| GB | 304 992 | 1/1929 |

* cited by examiner

*Primary Examiner*—David P. Bryant
*Assistant Examiner*—Sarang Afzali
(74) *Attorney, Agent, or Firm*—Young & Thompson

(57) ABSTRACT

A method for assembling a taper roller bearing, wherein a radially expandable and retractable clamping tool acts to retain the rollers of the roller bearing, a final assembly is formed by putting the inner and outer rings of the roller bearing together, and the clamping tool is subsequently withdrawn.

11 Claims, 5 Drawing Sheets

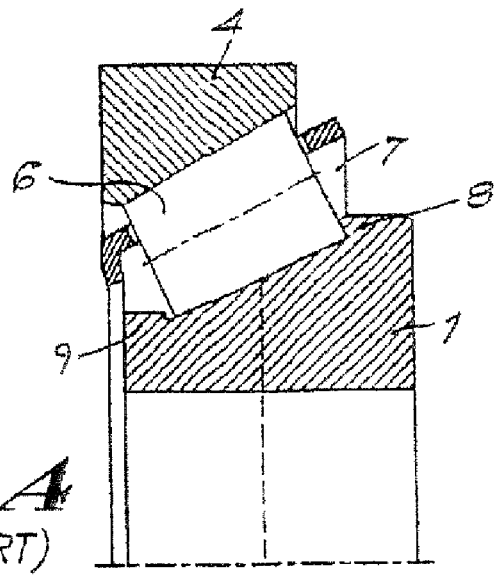
Fig.1 (PRIOR ART)
Fig.1A (PRIOR ART)
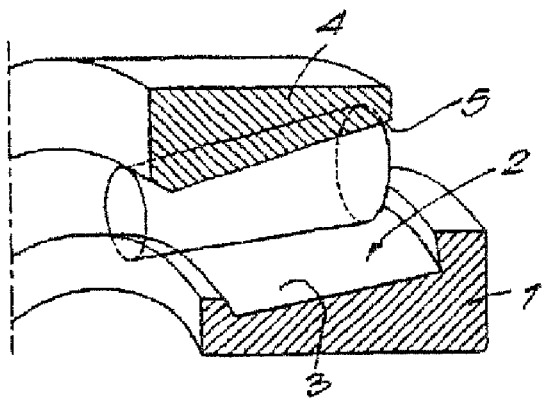
Fig.1B (PRIOR ART)
Fig.2 (PRIOR ART)
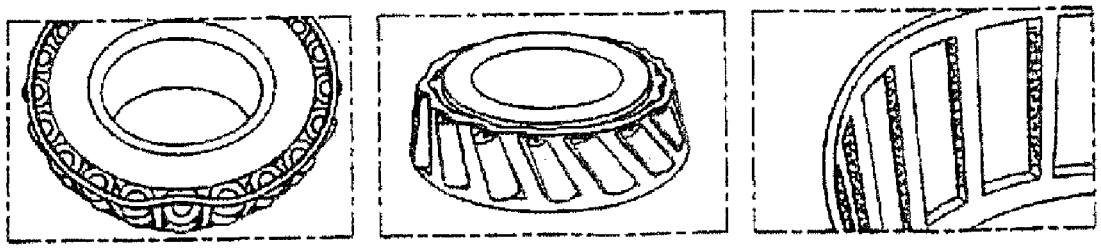
Fig.2A  Fig.2B  Fig.2C

METHOD OF ASSEMBLING A TAPER ROLLER BEARING

This application is a division of co-pending application Ser. No. 10/471,237, filed on Mar. 5, 2004, now U.S. Pat. No. 7,210,852, the entire contents of which are hereby incorporated by reference.

BACKGROUND OF THE INVENTION

This invention relates to a complete or full complement taper roller bearing by which is meant a taper roller bearing without a bearing cage and having a full complement of rollers.

DESCRIPTION OF THE RELATED ART

Taper roller bearings are well known as a roller bearing element. The normal design shown in FIGS. 1, 2 and 5 consists of an inner ring or cone, an outer ring or cup, rollers and a cage. The purpose of the cage is to guide the rollers and retain them in place in the absence of the cup, for example during assembly of the bearing. In an assembled arrangement the inner ring or cone, rollers and the cage form one unit whilst the outer ring is the other component by which the bearing can be mounted to shafts or into housings.

In the common design of taper roller bearings the axial guidance of the rollers is achieved by means of a recess on the inner ring or cone which in combination with the cage keeps the rollers in position and guides them to the center of the cone.

However this common design of taper roller bearing is prone to failure due to deformation of the cage, cage ring compression or cage pocket wear, examples of which are illustrated in FIGS. 2a, 2b and 2c respectively.

A full complement taper roller bearing in a well known O arrangement for shafts is known from U.S. Pat. No. 606,635. However, in this known configuration axial location and guidance of the rollers is by means of two axially spaced apart recesses provided on each of the taper roller bearing surfaces which engage with complimentary spaced apart ribs which project radially outwardly of the bearing surface or track of the radially inner ring or cone. The configuration of ribs and recesses on the bearing surfaces disclosed in U.S. Pat. No. 606,635 both reduces the load carrying capacity of the bearing by reducing the available roller surface and increases the risk of premature failure by wear and breakage of the ribs.

Accordingly it is an object of the present invention to provide a full complement taper roller bearing which overcomes or at least mitigates the above mentioned problems.

SUMMARY OF THE INVENTION

According to a first aspect the present invention provides a taper roller bearing of the full complement type consisting of an inner ring or cone having an inner track on its radially outer conical surface, and an outer ring or cup having an outer track on its radially inward conical surface and one or more rows of taper rollers having a contact angle of less than 30 degrees freely disposed between the inner and outer rings and guided between the said tracks, wherein each row of rollers is axially located within a recess on the inner track defined by a shoulder abutment disposed at the edge of the inner track having the greatest diameter and wherein each of the rollers is in contact with the inner track over the entire length of the taper roller in the axial direction of the bearing.

By contact angle is meant the angle between a straight line normal to the outer track and a straight line parallel to the plane of rotation of the bearing and as defined in ISO standard 281:1990.

Preferably the contact angle is in the range of 5 to 30 degrees, more preferably it is between 10 and 20 degrees inclusively.

BRIEF DESCRIPTION OF THE DRAWINGS

Further aspects on the present invention will become apparent from the description of following embodiments of the invention and in conjunction with the following drawings in which:

FIGS. 1a and 1b shows schematic cross sectional diagrams of a conventional, bearing comprising taper rollers confined in cage; and FIGS. 2a to 2c show various aspects of damage to the bearing cage due to problems in service.

DETAILED DESCRIPTION OF THE PREFERRED EMBODIMENTS

Figure 3:
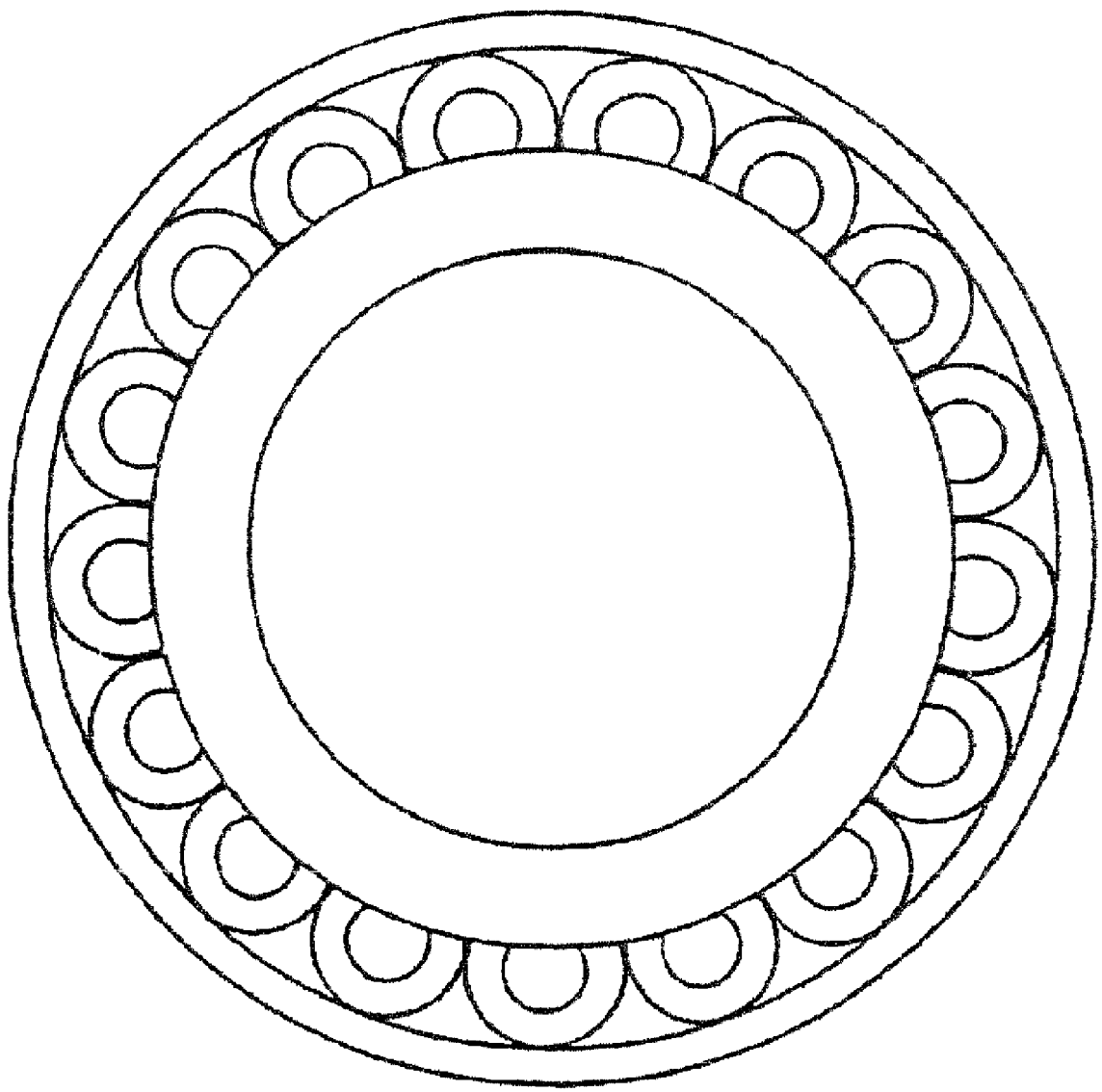
FIG. 3 shows a view taken from the heel side of the inner ring or cone of a full complement taper roller bearing according to the present invention.

Shown in FIG. 1a and 1b is the assembly of a conventional caged type taper roller bearing comprising the elements of an inner ring or cone 1, an outer ring or cup 4 and freely disposed between the cone and cup a plurality of rollers 6 contained within a circumferentially extending cage 7.

The radially outer conical surface 3 of the inner ring or cone is provided with inner track 2 and similarly the radially inwardly facing conical surface 5 of the outer ring or cup 4 provides an outer track.

The taper rollers are located and guided in the inner track 2 by virtue of shoulder abutments 8, 9 provided at the axial edges of the inner ring, which shoulder abutment 8 acts on the plane end of the taper rollers when the bearing is loaded. The axial edge of the inner track having the greater diameter is commonly referred to as the heel whilst the edge having the lesser diameter is commonly referred to as the toe. Accordingly the shoulder abutments 8, 9 will be referred to respectively as the heel shoulder abutment and the toe shoulder abutment.

Figure 4:
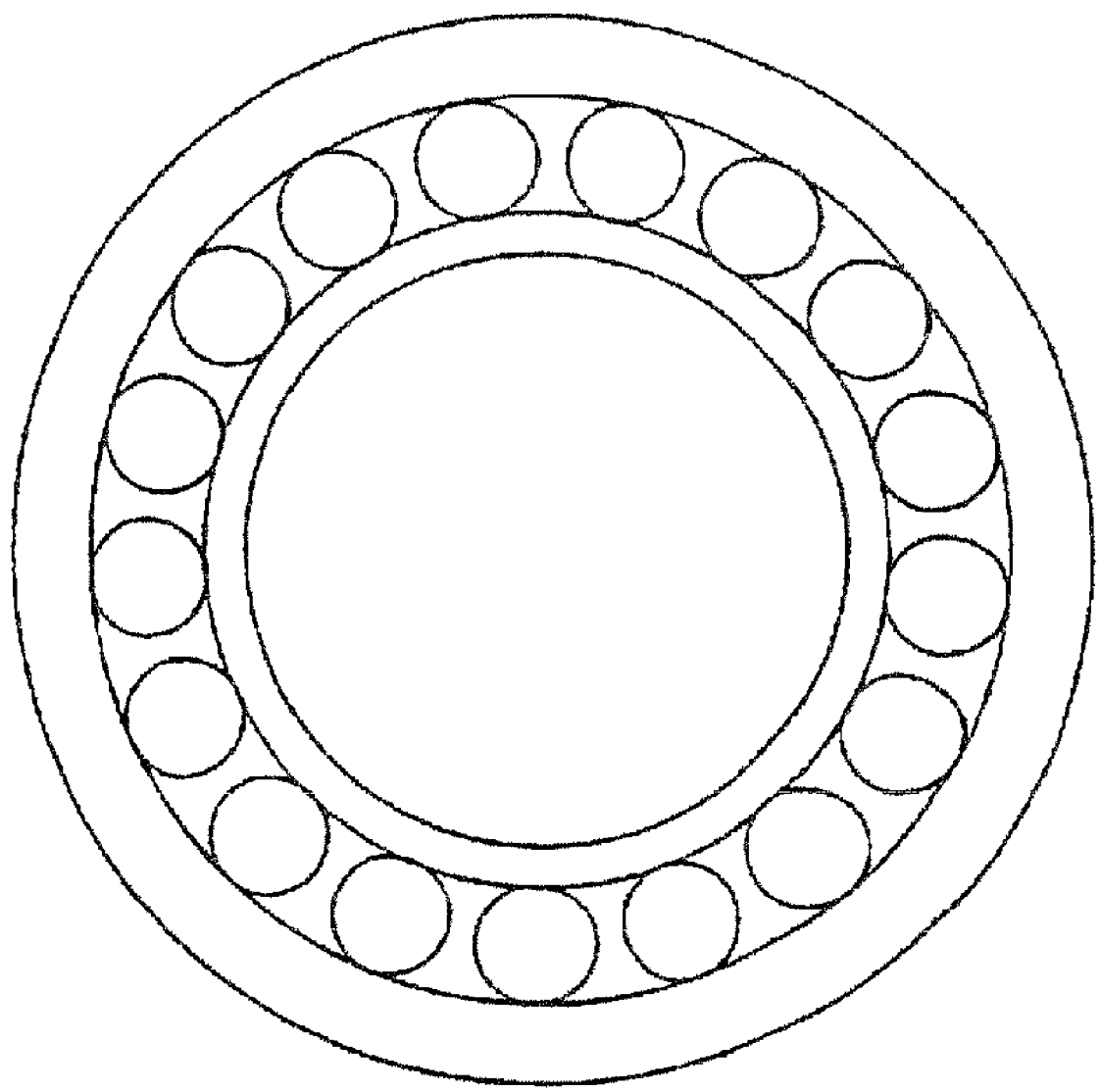
FIG. 4 shows a view of the full complement bearing of FIG. 3 taken from the toe side of the inner ring.
Figure 5:
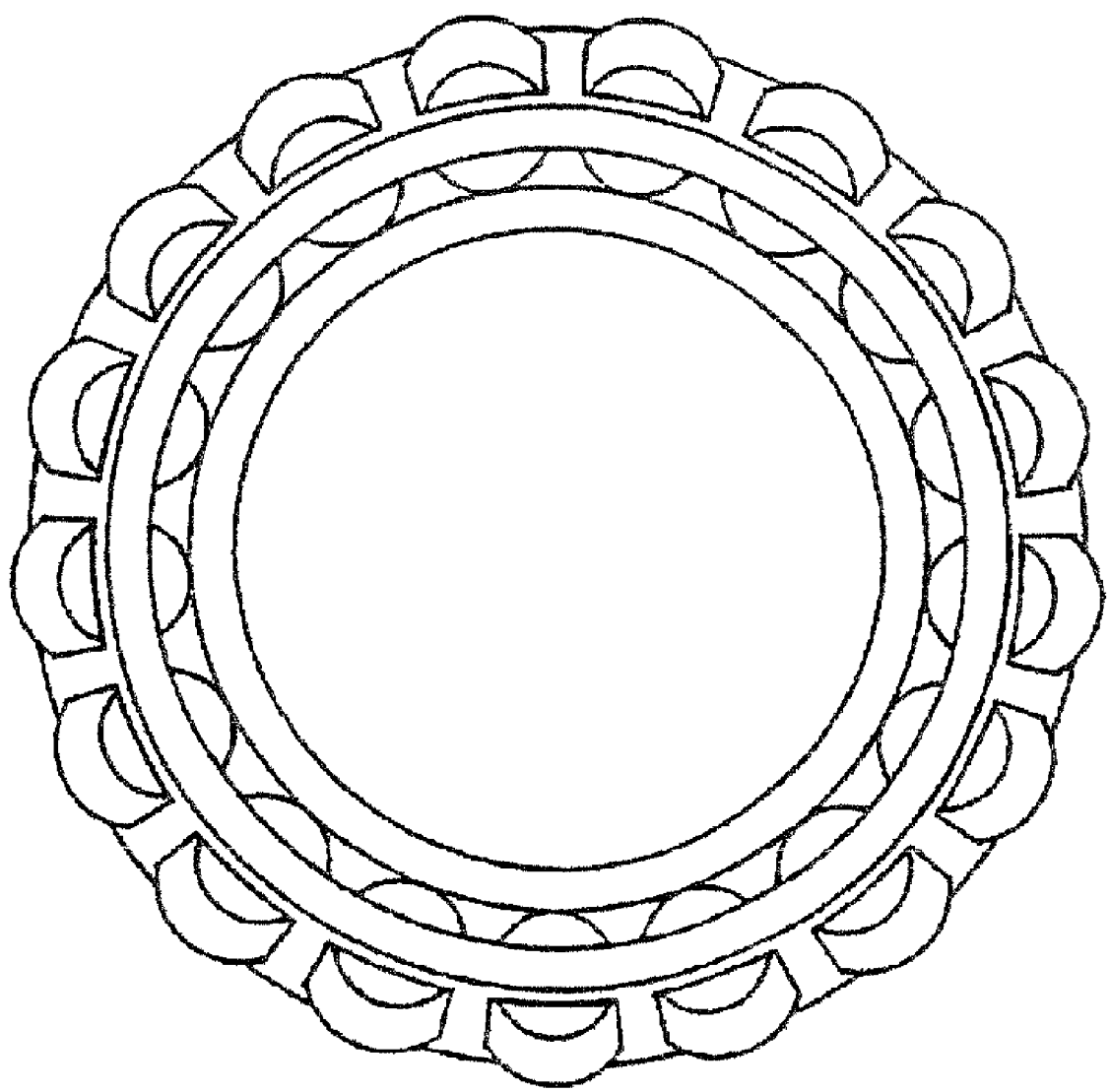
FIG. 5 shows a view of an assembly of an inner ring rollers and cage of a conventional taper roller bearing.

Shown in FIGS. 3 and 4 is a full complement taper roller bearing according to the present invention.

FIG. 3 shows a view of the bearing from the heel side of the inner ring or cone and clearly shows a full complement of rollers without a roller cage. FIG. 3 also shows that the bearing is provided with a heel shoulder abutment on the inner ring whereas on the toe side of the inner ring no such shoulder abutment is provided as is evident from FIG. 4.

Whilst the bearing of the present invention shown in FIGS. 3 and 4 has by necessity a roller locating and guiding heel shoulder abutment it may also have a toe shoulder abutment on the inner ring.

Figure 6:
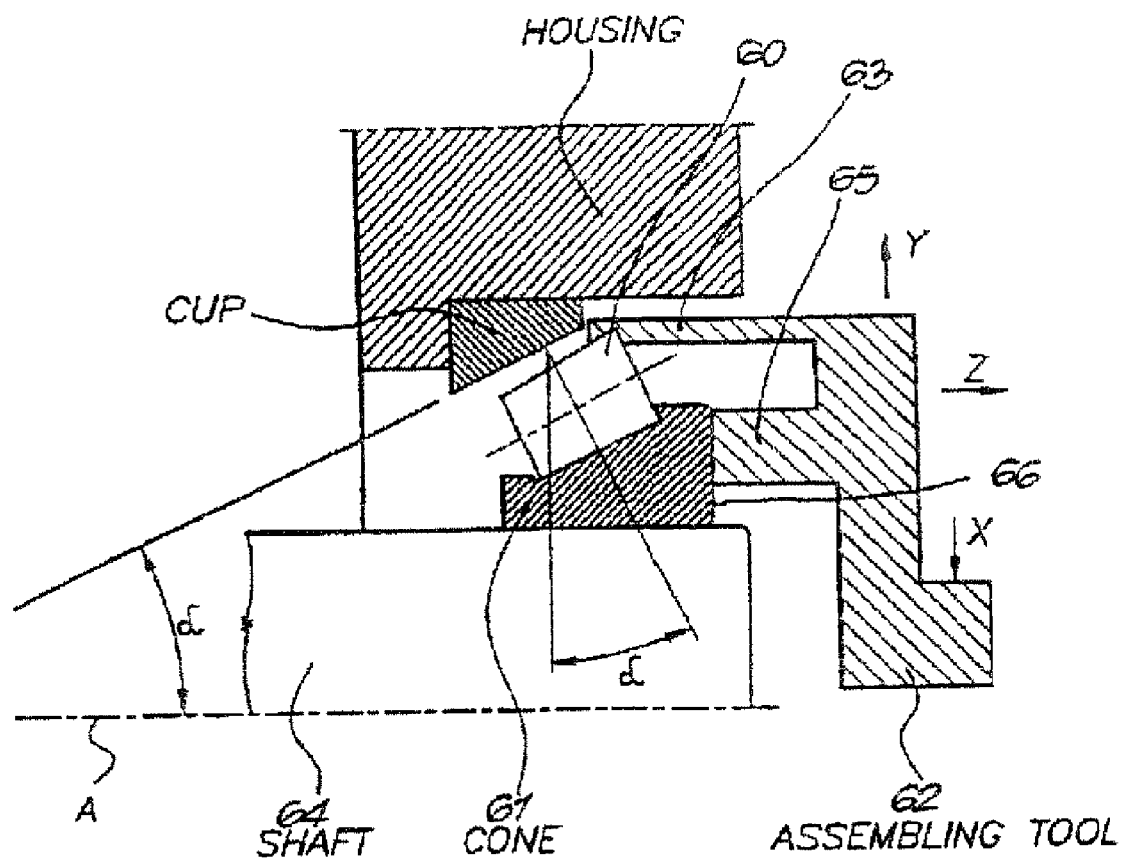
FIG. 6 shows a schematic scrap sectional view of one method of assembling the full complement bearing of the present invention using an assembly tool.

The contact angle α which the angle between a straight line extending perpendicularly from the outer track and a line parallel to the plane of rotation or bearing as shown in FIG. 6 is in accordance with the present invention not less than 5 degrees and not greater than 30 degrees. Contact angle α thus corresponds with the inclination of the outer track to longitudinal axis A of the shaft to which the inner ring or cone is fitted. Preferably the contact angle of the bearing is in the range of 10 to 20 degrees such that the bearing is particularly suitable for use in radially directed high load conditions.

The present invention is particularly directed to bearings of a heavy duty type for use with shafts in the range of 25 mm to 150 mm in diameter. Typically the maximum speed conditions encountered in such uses would be approximately 5,500 rpm for a 25 mm diameter shaft and 1,500 rpm for a 150 mm diameter shaft.

Whilst the above described full complement taper roller bearing has only one shoulder abutment on the heel side of inner ring or cone it may in addition have a shoulder abutment on the toe side.

In addition to providing a full complement taper roller bearing the invention also provides various methods of assembling the components of the bearing.

A first method of assembly of the bearing is shown in FIG. 6 which shows a half sectional view of the components of a bearing together with an assembly tool 62. It is to be understood that FIG. 6 only shows one half of the arrangement and the other half is disposed symmetrically below the axis A of the shaft. Accordingly the assembly tool 62 is substantially cylindrical in shape and is diametrically split into top and bottom halves, the top half being shown in FIG. 6. The radially outer cylindrical surface of the assembly tool 62 is provided with an axially extending projection 63 which by movement apart of the two halves of the assembly tool 62 in the direction indicated by arrow Y can be positioned axially inward of the axial and radial outer edge of the rollers.

Thereafter by movement of the two halves of the assembly tool 62 back towards each other in the direction indicated by arrow X the projection 63 can engage the axial and radial outer edge of the rollers. The axial end of the projection 63 may be shaped on its radially inward side to conform to the axially and radially outward portion of the roller as shown to facilitate engagement with the roller.

According to the first method of assembly illustrated in FIG. 6 the taper rollers 60 are assembled into their final position of the inner track of the cone 61 and held there by means of the assembly tool 62 having an axially extending projection 63 which contact and hold the axially and radially outer portion of each roller to clamp the roller in the track as shown. The assembly tool 62 is generally of cylindrical shape having a diameter across the axial projection 63 which is less than the outer diameter of the outer ring or cup such that the cup may be assembled into its final housing whilst still enabling the assembly of the taper rollers with the inner cone and the cup to be moved towards each other into the position of close proximity shown in FIG. 6. The assembly tool 62 has another axial extending projection 65 radially inward of the projection 63 which abuts as shown the heel side of the inner ring 61 to facilitate movement of the assembly. Further the thickness dimension of the projection 63 in the radial direction and the outer diameter of the cup are such as to permit sufficient movement apart of the halves of the assembly tool 62 to enable withdrawal of the tool.

Once the assembly is in the position shown in FIG. 6 the two halves of the assembly tool 62 are moved radially apart in the direction indicated by arrow Y until the projection 63 are clear of the rollers at which point the parts of the assembly tool are withdrawn in the direction Z. The close proximity of the assembly of the rollers and the cone to the cup ensures that the rollers can not be dislodged and in the final operation the cup and roller cone assembly are again moved towards each other to reach their final position and complete the assembly.

Full complement taper roller bearings according to the invention provide high load carrying capabilities by virtue of a greater number of rollers and utilisation of the entire width of the roller surface with reduced risk of premature failure by elimination of a roll cage.

The invention claimed is:

1. A method of assembling a taper roller bearing, comprising the steps of:

providing a taper roller bearing, the roller bearing having an inner ring with a radial outer conical surface, a track on the outer conical surface, an outer ring with a radially inward conical surface, an outer track on the inward conical surface, and one or more rows of taper rollers;

forming a first assembly of rollers on the track of one of the inner ring and the outer ring;

applying retaining means to retain the rollers on the track of the one of the inner ring and the outer ring;

after the applying of the retaining means, forming a final assembly by putting together the first assembly with the other of the inner ring and the outer ring; and after the forming of the final assembly, removing the clamping elements, wherein the retaining means comprises radially expandable and retractable clamping elements acting on the rollers.

2. The method according to claim 1, wherein at least one of the inner ring and the outer ring is conical.

3. The method according to claim 1, wherein the clamping elements are retracted prior to being removed.

4. The method according to claim 1, wherein the taper roller bearing is a full compliment taper roller bearing.

5. The method according to claim 1, wherein the one of the inner ring and the outer ring is the inner ring.

6. The method according to claim 1, wherein the one of the inner ring and the outer ring is the outer ring.

7. A method of assembling a taper roller bearing having an inner ring or cone with a radially outer conical surface, a track on the outer conical surface, an outer ring or cup with a radially inward conical surface, an outer track on the inward conical surface, and one or more rows of taper rollers, the method comprising the steps of:

forming a first assembly of rollers on the track of one of the inner ring or cone and the outer ring or cone;

applying retaining means to retain the rollers on the track of the one of the inner ring or cone and the outer ring or cone; and subsequently forming a final assembly by putting together the first assembly with the other of the inner ring or cone and the outer ring or cone, wherein the retaining means comprises radially expandable and retractable clamping elements acting on the rollers, and wherein the clamping elements are removed from the final assembly after forming the same.

8. The method according to claim 7, wherein the taper roller bearing is a full compliment taper roller bearing.

9. The method according to claim 7, wherein the one of the inner ring or cone and the outer ring or cone is the inner ring or cone.

10. The method according to claim 7, wherein the one of the inner ring or cone and the outer ring or cone is the outer ring or cone.

11. The method according to claim 7, wherein the clamping elements are moved apart prior to being removed.

* * * * *